UNITED STATES PATENT OFFICE.

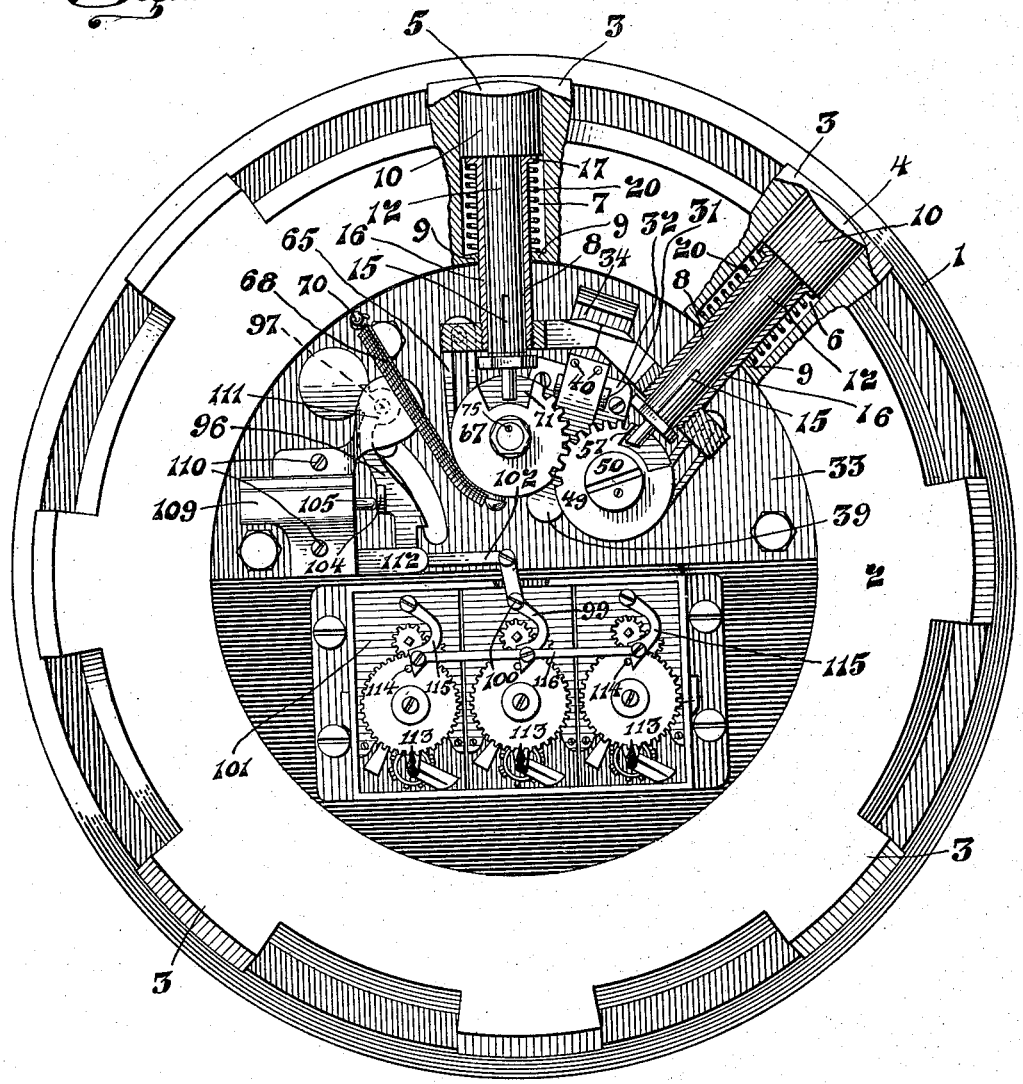

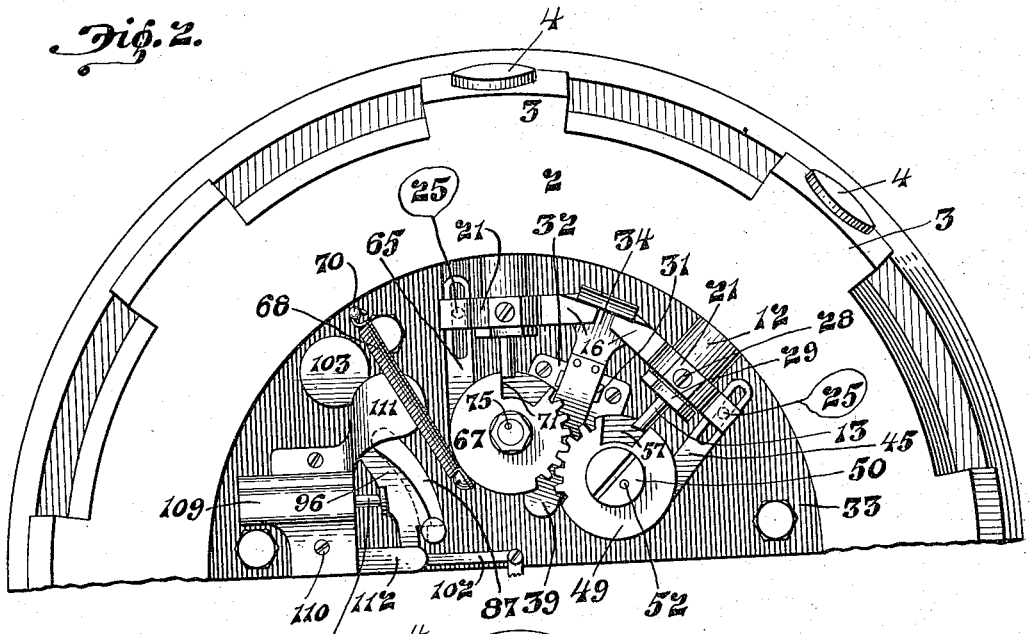
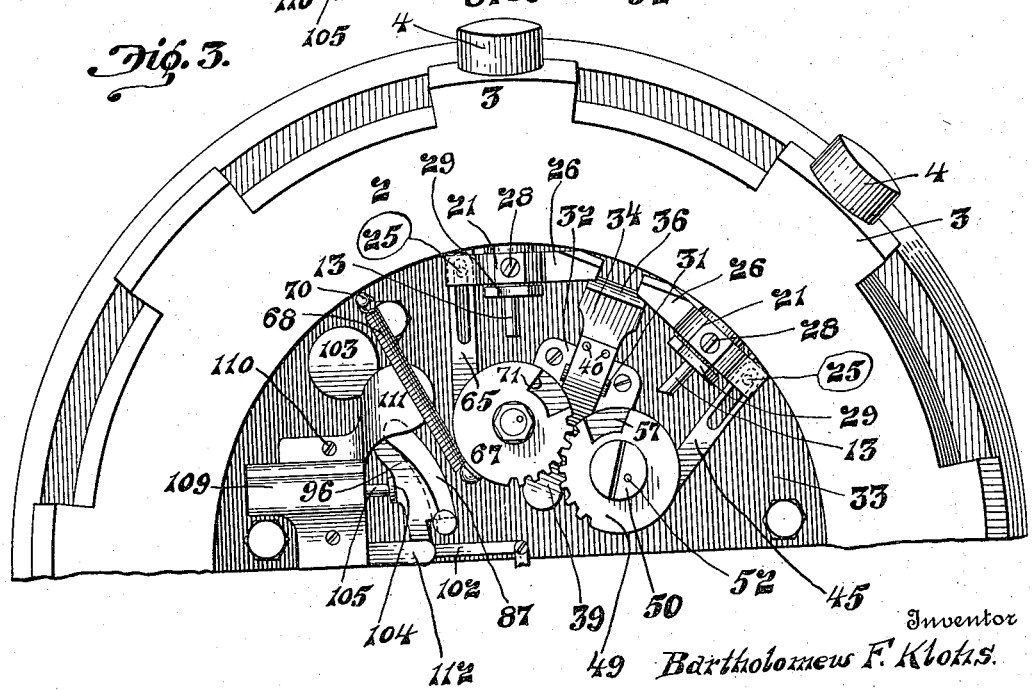

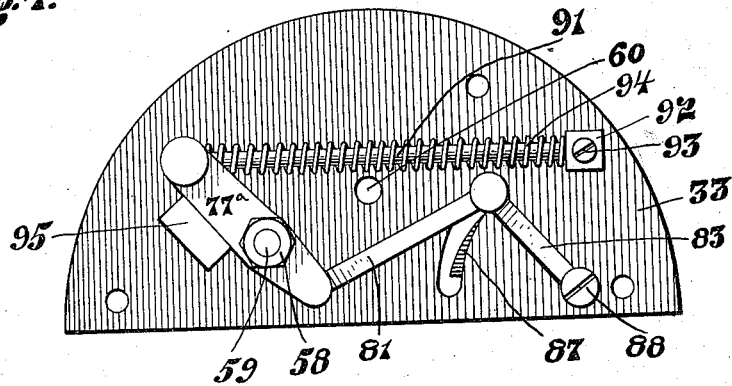
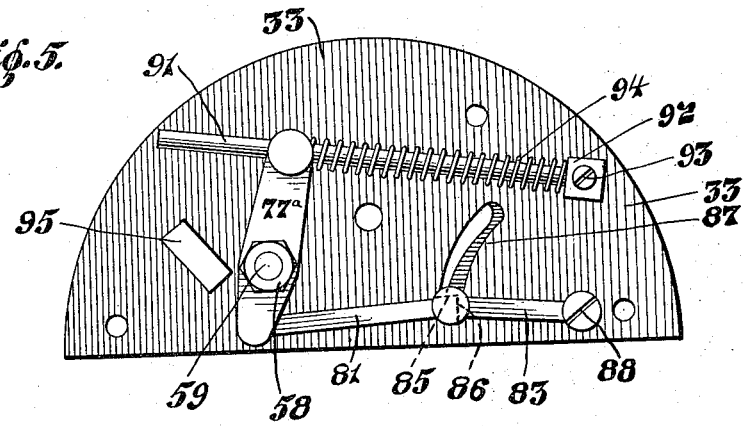
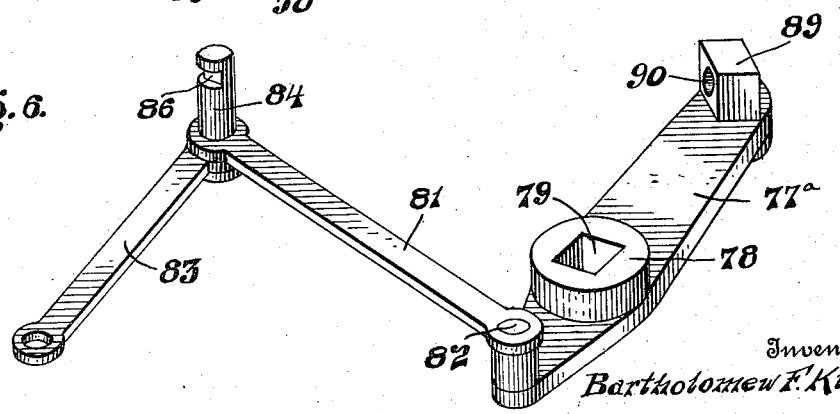

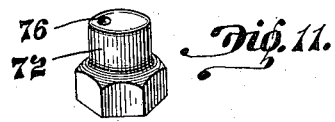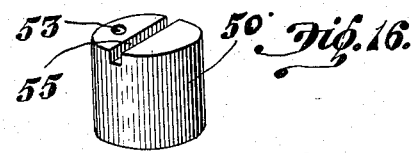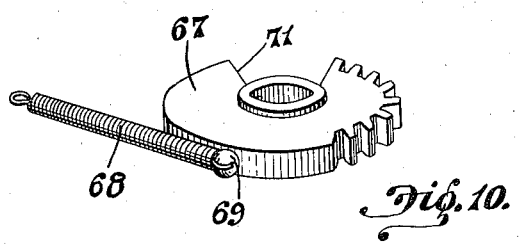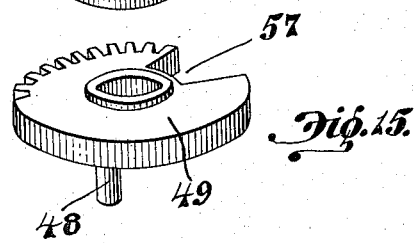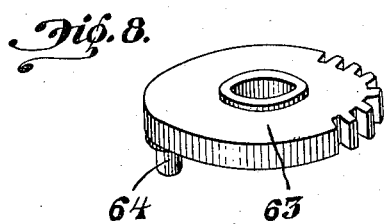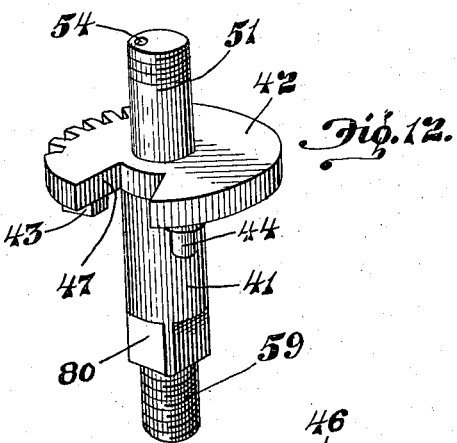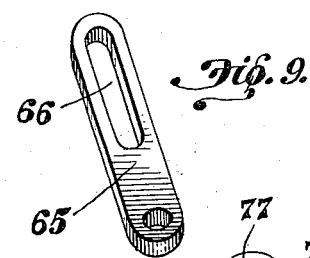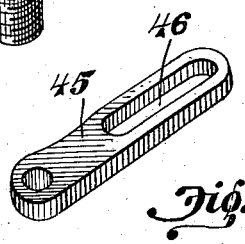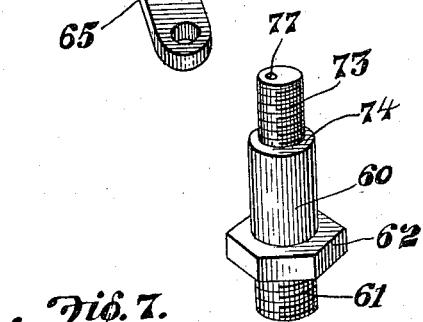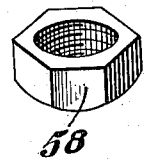

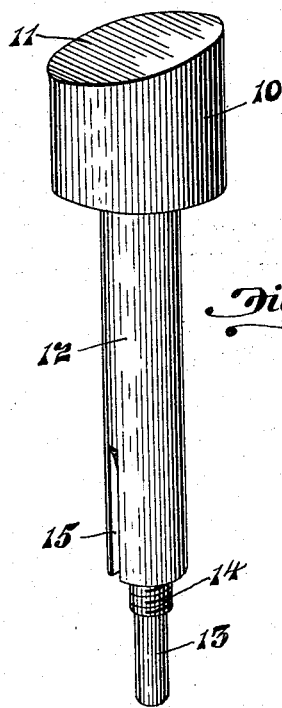
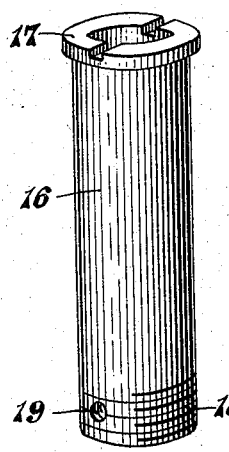
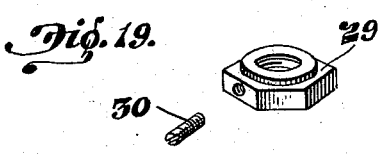
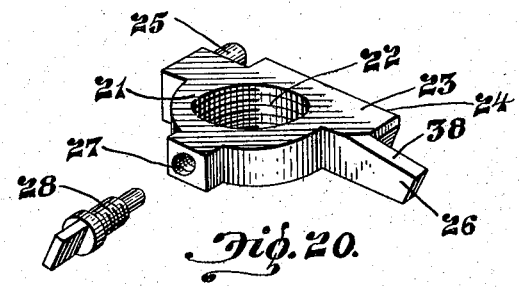
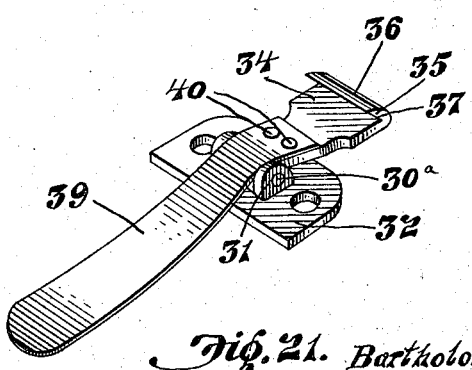

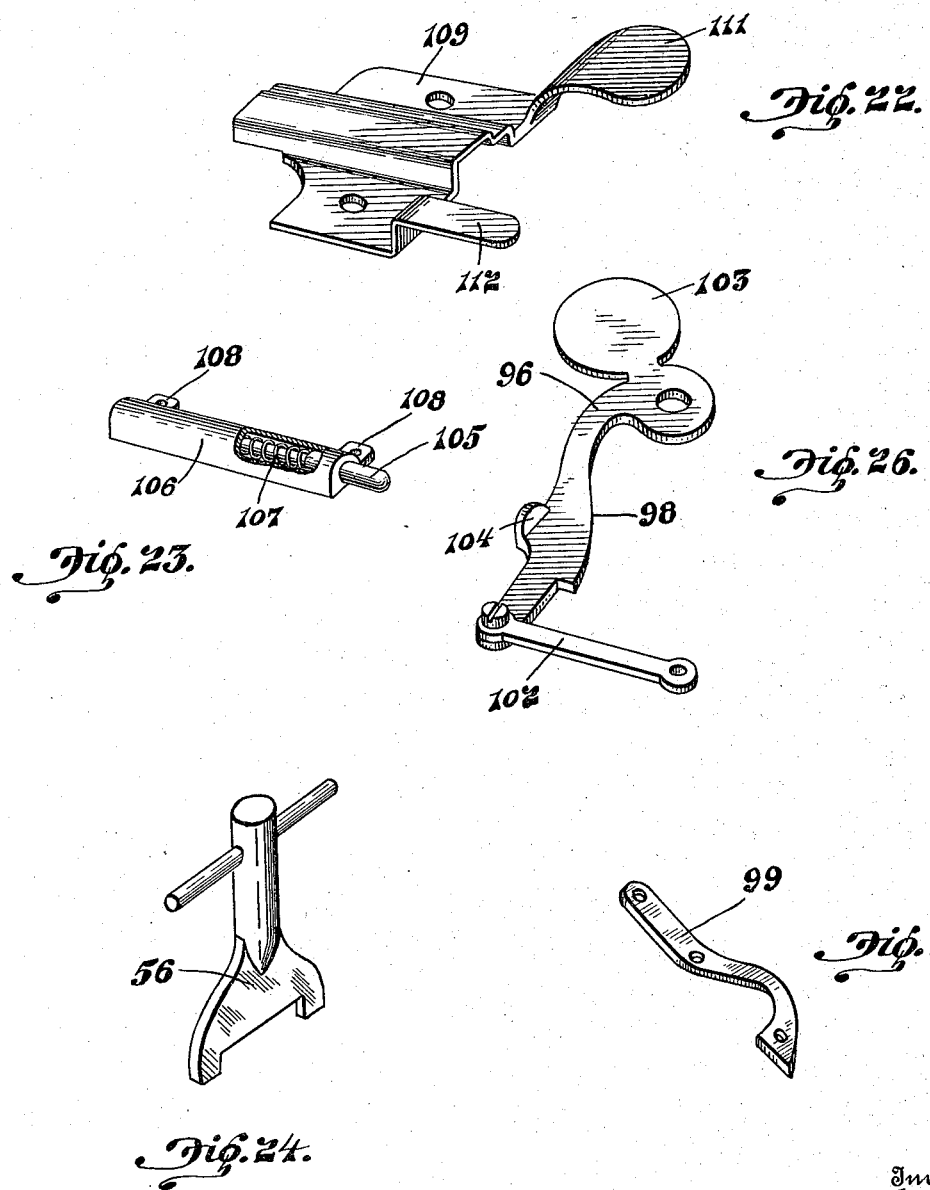

BARTHOLOMEW F. KLOHS, OF CANTON, OHIO.

LOCK MECHANISM FOR SAFES.

1,145,371.  Specification of Letters Patent.  Patented July 6, 1915.

Application filed March 31, 1915. Serial No. 18,310.

*To all whom it may concern:*

Be it known that I, BARTHOLOMEW F. KLOHS, a citizen of the United States, residing at Canton, in the county of Stark and State of Ohio, have invented a new and useful Lock Mechanism for Safes, of which the following is a specification.

My invention relates to improvements in lock mechanism for safes, and especially relates to time lock mechanism.

The objects of the invention are to generally improve devices of the character mentioned, to produce more positive and certain operations of the lock and to provide a device in which the strain of operating the bolts, especially in unlocking, will be removed from the clock movement thus preventing any undue strain thereof.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the drawings: Figure 1 is a rear elevation of a safe door provided with a time lock embodying my invention, showing the parts in unlocked position, parts being broken away for the purpose of illustration. Fig. 2 is a similar elevation of the upper portion of the door showing the parts in set position. Fig. 3 is a similar view showing the parts in locked position. Fig. 4 is a front elevation of the plate supporting the bolt actuating mechanism showing the several parts in the unlocked position. Fig. 5 is a view of the same showing the parts in the set or locked position. Fig. 6 is an enlarged perspective view of the main bolt retracting lever with the controlling links and tripping head connected thereto. Fig. 7 is a detail perspective view of the secondary bolt controlling pin. Fig. 8 is a detail perspective view of the lower gear carried by the secondary bolt controlling pin. Fig. 9 is a detail perspective view of the slotted link carried by the lower gear upon the secondary bolt controlling pin. Fig. 10 is a detail perspective view of the upper notched gear mounted upon the secondary bolt controlling pin, showing the spring carried thereby. Fig. 11 is a detail perspective view of the screw cap carried by the secondary bolt controlling pin. Fig. 12 is a perspective view of the prime bolt controlling pin and the gear carried thereon. Fig. 13 is a perspective view of the slotted link connected to the gear on the prime bolt controlling pin. Fig. 14 is a perspective view of the nut provided upon the lower end of the prime bolt controlling pin. Fig. 15 is a perspective view of the upper gear carried upon the prime bolt controlling pin. Fig. 16 is a perspective view of the screw thread cap upon the top of the prime bolt controlling pin. Fig. 17 is a perspective view of one of the bolts. Fig. 18 is a perspective view of one of the bolt barrels. Fig. 19 is a perspective view of the retaining nut for the bolt, with the set screw detached. Fig. 20 is a perspective view of the bolt barrel controlling collar, with a detached screw pin belonging thereto. Fig. 21 is a perspective view of the bolt set-retaining catch. Fig. 22 is a perspective view of the trigger and trigger-backer guard. Fig. 23 is a perspective view of the trigger-backer, a part being broken away. Fig. 24 is a perspective view of a key adapted for use on the device. Fig. 25 is a detail perspective view of the trigger actuating lever. Fig. 26 is a perspective view of the trigger.

Similar numerals of reference indicate corresponding parts throughout the several figures of the drawings.

In illustrating the invention it is thought unnecessary to illustrate any part of the safe or vault except the door and it will be noted that I have selected a door of the circular type, although it will be understood that the invention is also applicable to other types of doors.

More specifically describing the construction illustrated in said drawings, the numeral 1 indicates the door generally, said door being provided with the fixed, annular, rearwardly extending locking ring 2. Said locking ring is provided with the peripheral locking projections or lugs 3 of the usual well known form. The prime bolt 4 and secondary bolt 5 are preferably radially slidably arranged in radially disposed bolt recesses 6 and 7 respectively arranged in two, respective lugs 3 as well as the locking ring 2. Said recesses 6 and 7 open at their outer ends through the lugs 3, but at their inner ends stop short of extending through the ring 2, a smaller bolt barrel aperture 8, however, concentric with the bolt recess extending from each of said recesses inwardly through the inner edge of the ring 2, producing the annular spring-engaging ledges 9.

Each bolt comprises a locking head 10, preferably provided with an inclined end face 11 corresponding, when the bolt is retracted, with the peripheral surface of the lug 3 in which the bolt is arranged. Connected to the head 10 is the reduced bolt stem 12 provided at the end opposite of the head 10 with the fixed disengaging stem 13 provided adjacent the end of the stem 12 with the screw threads 14. In the end of the stem 12 adjacent the threads 14 is the longitudinally disposed groove 15.

For each bolt there is provided a bolt barrel 16 which comprises a cylindrical member of a length substantially equal to the length of the stem 12 and provided with a central bore adapted to slidably receive the stem 12. At the outer end the barrel is provided externally with the annular spring engaging ledge 17 and the inner end of the barrel is provided with the external screw threads 18 and a radial aperture 19 registering in circumferential dimension with the groove 15 on the stem 12.

In arranging either of the bolts in its proper bolt recess in the door the bolt barrel 16 is provided externally with a compressible coiled bolt projecting spring 20, which bears at its outer end against the ledge 17. The inner end of the barrel is then inserted through the bolt barrel aperture 8, which slidably receives it, thus bringing the inner end of the spring 20 into engagement with the ledge 9. On the inner side of the locking ring 2 the bolt barrel controlling collar 21 is then connected to the inwardly projecting screw threaded end of the bolt barrel. Each of said bolt barrel controlling collars is provided with a bolt barrel receiving aperture provided with screw threads 22. Formed integrally with said collars is a supporting plate engaging portion 23 having a plain straight edge 24 adapted to bear against said plate, as will hereinafter more fully appear. Also formed integrally with said collars is the retracting link engaging pin 25 and the retaining catch disengaging finger 26. The collars just described are substantially alike for both of the bolts except that in the construction illustrated they are made rights and lefts so that the fingers 26 of the two collars will be directed toward each other as clearly illustrated in the drawings. Each collar is provided with a screw threaded aperture 27 adapted to receive a screw pin 28 which extends through the aperture 19 of the bolt barrel and into the groove 15 of the bolt stem. Each collar 21 is therefore firmly connected to its bolt barrel 16 by the screw threads 18 and 22 as well as by the pin 28, and the stem 12 and locking head 10 of the bolt are prevented from rotation within the barrel 16 by reason of the engagement of the pin 28 with the walls of the groove 15. For the purpose of preventing the stem 12 from sliding outwardly from the barrel 16 a retaining nut 29 is screwed into the threads 14 at the inner end of the stem 12, said nut being adapted to bear against the inner end of the barrel 16. A set screw 30 extending radially through the edge of the nut 29 into engagement with the threads 14 prevents the nut 29 from disengagement from the bolt.

The bolt set-retaining catch is pivoted at 30 to the ears 31 provided upon a bracket 32, said bracket being secured to the plate 33 which supports the bolt actuating mechanism. The catch consists of a lever, the forward shorter extremity 34 of which is provided with an upwardly and rearwardly disposed flange 35, the outer face of said flange being beveled as at 36, to allow the fingers 26 to ride backward over said flange when the bolts are automatically unlocked by means of the time lock mechanism as will hereinafter be described. A V-shaped groove 37 is thus formed between the flange 35 and the body portion of the lever 34, said groove being arranged to receive the beveled edges 38 of the fingers 26 when the bolts are in the set position as illustrated in Fig. 2 of the drawings. The long arm of the lever forming the bolt set-retaining catch comprises a leaf spring 39 which is connected to the shorter arm 34 in any suitable and well known manner as by the rivets 40.

The prime bolt controlling pin 41 is journaled through a suitable aperture in the plate 33 and has fixed thereto the lower gear wheel 42 upon which gear wheel is provided a lug 43 which bears upon the tail of the spring 39 as will be hereinafter described and the pin 44 upon which is pivoted the slotted link 45. The link 45 is provided with an elongated slot 46 within which is seated the pin 25 upon the prime bolt barrel controlling collar. A notch 47 is provided in the periphery of the lower gear 42 for the purpose of receiving the pin 48 which is provided upon the upper gear 49, said upper gear being loosely mounted upon the prime bolt controlling pin. A screw cap 50 is placed upon the upper screw threaded extremity 51 of the prime bolt controlling pin and a pin 52 is located through the aperture 53 in the cap and the aperture 54 in the upper extremity of the bolt controlling pin.

The cap 50 is provided with a diametrical slot 55 for the purpose of receiving a key 56 which is used in setting the mechanism. The gear 49 is provided with a notch 57 adapted to receive the disengaging stem of the prime bolt when the bolts are in the set or unlocked position. A nut 58 is provided upon the lower screw threaded extremity 59 of the prime bolt controlling pin for the purpose of retaining the main bolt-retracting lever as will hereinafter be described.

The secondary bolt controlling pin 60 is connected to the plate 33 by means of the screw threaded shank 61, a shoulder 62 being provided upon said pin for the purpose of abutting against the face of the plate 33 when the secondary bolt controlling pin is properly adjusted. The lower gear 63 is loosely mounted upon the secondary bolt controlling pin and is provided upon its under surface with a stud 64, to which is pivotally connected the slotted link 65, said link being provided with an elongated slot 66 within which is seated the pin 25 upon the secondary bolt barrel controlling collar. The upper gear 67 is also loosely mounted upon the secondary bolt controlling pin and a coil spring 68 is attached thereto by means of a screw or its equivalent 69, said coil spring being also attached to a suitable pin 70 which is connected to the plate 33. A slot 71 is provided in the periphery of the gear 67 and adapted to receive the disengaging stem of the secondary bolt. A screw cap 72 is attached upon the reduced screw threaded shank 73 of the secondary bolt controlling pin, said screw cap contacting with the shoulder 74 provided upon said pin, thus allowing the gears 63 and 67 to rotate freely upon said pin. A pin 75 is passed through screw threaded apertures 76 and 77 in the screw cap and secondary bolt controlling pin respectively for the purpose of preventing any relative movement between said screw cap and said bolt controlling pin.

The main bolt retracting lever 77ª is provided with a boss 78, said boss having a squared aperture 79 formed therein for the purpose of receiving the squared portion 80 of the prime bolt controlling pin, thus causing the prime bolt controlling pin to be rotated with the main bolt retracting member. The relatively long controlling link 81 is pivoted at 82 to the short arm of the main bolt retracting lever, said link being pivoted to the relatively short controlling link 83 by means of the tripping head 84, said tripping head being provided with the flat faces 85 and 86 which are adapted to contact with the trigger as will be hereinafter described. The tripping head 84 is arranged in an arc shaped groove 87 formed in the plate 33, the center from which said arc is drawn being the pivotal point 88 of the relatively short controlling link 83. A block 89 is pivoted upon the long arm of the main bolt retracting lever and provided with an aperture 90 through which is passed one extremity of the rod 91, the other extremity of said rod being provided with a head 92 which is pivoted at 93 upon the plate 33, a tension spring 94 being interposed between the block 89 and the head 92. A stop 95 is provided upon the plate 33 for the purpose of limiting the movement of the main bolt retracting lever when the bolt actuating mechanism is thrown into the unlocked position.

The trigger 96 is pivoted at 97 upon the plate 33 and is provided with the convex face 98 which is arranged to lie adjacent the curved slot 87 in the plate 33. The trigger actuating lever 99 is pivoted at 100 upon the supporting plate of the time clock which is indicated generally by the numeral 101, said lever being pivotally connected to the lever by means of the trigger connecting link 102. The trigger is provided with a counterweight 103 and with the lug 104 adapted to be contacted by the spring pressed plunger 105 of the trigger backer, said plunger being slidably mounted in a casing 106 and provided with a compression spring 107 for the purpose of normally holding the extremity of said plunger in engagement with the lug 104. The casing 106 of the trigger backer is connected to the plate 103 by means of the screws or their equivalents being passed through the apertures 108 and the guard 109 is placed over said trigger backer and connected to the plate 33 by means of suitable screws 110, said guard being provided with the extensions 111 and 112 which are located over the pivotal points of the trigger for the purpose of preventing the screws forming said pivots from becoming dislodged.

When the safe door is open the several parts are in the unlocked position as shown in Fig. 1 of the drawings. Before closing the door the time clock mechanism which is of the usual type is set for a predetermined time when the bolts are to be unlocked. When this time clock has been properly set each of the gear wheels 113 will have been rotated to the left, bringing the tripping studs 114 upon said gears out of contact with the trigger actuating mechanism. The time clock shown in the accompanying drawings is one of the type in which three independent clocks are used as a matter of precaution in case one of the clocks should fail to operate. The tripping pin upon the central clock contacts with the extremity of the trigger actuating lever 99 while the tripping pins upon the two adjacent clocks contact with the pivoted links 115, said links being pivotally connected to the trigger actuating lever 99 by means of a bar 116. As the trigger actuating mechanism is thus released from contact with the tripping pins upon the time clock mechanism the trigger backer will cause the trigger to be thrown into the position shown in Fig. 2 of the drawings, the concaved face 98 of the trigger being moved across the curved slot 87 in the plate 33. The key 56 is then placed in the slot 55 of the cap upon the prime bolt controlling pin and turned slightly to the left, rotating the fixed gear 42 and the lower gear 63 upon the secondary bolt controlling pin, thus moving the slotted links 45 and 65 respectively into the position shown in Fig. 2, releasing the bolt barrel controlling collars and allowing the bolt barrels to be moved outwardly by means of the springs 20, the fingers upon the barrel controlling collars engaging with the flange 35 upon the bolt set-retaining catch, thus holding the bolts in the position shown in Fig. 2. The upper gear 49 upon the prime bolt controlling pin is slightly rotated by means of the pin 48 thereon projected into the slot 47 in the lower fixed gear 42 and as said gear 49 rotates, it causes the upper gear 67 upon the secondary bolt controlling pin to rotate, bringing these gears into the position shown in Fig. 2. As the main bolt controlling pin is thus rotated, the main bolt retracting lever 77a will be moved into the position shown in Fig. 5, the controlling links 81 and 83 moving, the tripping head through the curved slot 87, the shoulder upon the trigger contracting with the flat face 85 of said tripping head and retaining the parts in this position. As the door is closed the inclined faces 11 of the bolts will contact with the inner inclined face of the door casing, pushing the bolts back sufficiently to allow the fingers 26 upon the bolt barrel controlling collars to be released from the bolt set-retaining catch and as the lug 43 upon the fixed gear 42 has already been moved out of contact with the spring tail 39 of the bolt set-retaining catch, the spring will cause the shorter end 34 of the catch to be moved downwardly bringing the flange 35 below the plane of the fingers 26 and as the door reaches the end of its movement the bolts will be shot into place by means of the springs 20, which control the bolt barrels and the gears 49 and 67 being released by the disengaging stems 13 of the bolts the spring 68 will throw these gears into the position shown in Fig. 3 of the drawings. All of the parts will then have assumed the locked position illustrated in Fig. 3, and the parts will remain in this position until the predetermined time for which the time clock mechanism is set has elapsed.

When the time for which the time clock was set has arrived the gears 113 in the time clocks will have rotated to a position bringing the tripping pins 114 thereon into engagement with the tripping lever and links as shown in Fig. 1 of the drawings, tripping the trigger, thereby releasing the main bolt retracting head and allowing the main bolt retracting lever and controlling links to be thrown into the position shown in Fig. 4 by means of the bolt retracting spring 94. The prime bolt controlling pin will thus be rotated by means of the main bolt retracting lever, causing the gears carried thereon to operate the gears upon the secondary bolt controlling pin bringing the upper gears upon said pins into the position shown in Fig. 1, the notches in said gears being brought into position to receive the disengaging stems of the bolts, the slotted links carried by the lower gears pulling the bolts into the unlocked position.

It will be seen from an inspection of Fig. 3 of the drawings that when the parts are in the locked position it will be impossible to unlock the bolts before the time clock mechanism has completed its operation as the peripheral notches 57 and 71 in the upper gears 49 and 67 respectively are so positioned at this time that they will not receive the disengaging stems of the bolts and therefore the bolts cannot be forced back as the disengaging stems thereon will contact with the peripheries of the gears.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. A device of the character described, comprising a safe door, a bolt slidably mounted in said door, a bolt controlling pin journaled in said door, a disk fixedly mounted upon said bolt controlling pin, a slotted link pivotally connected to said disk, a pin carried by said bolt and projecting through the slot in said link, a spring arranged to normally hold said bolt in the locked position, a retaining catch adapted to hold said bolt in the set position, means for disengaging the bolt from said retaining catch when the door is closed, a second disk loosely mounted upon said bolt controlling pin, said second disk being provided with a peripheral notch adapted to receive the inner extremity of the bolt, a pin carried by said second named disk and extending into an elongated notch in said first named disk, a spring pressed bolt retracting lever fixedly mounted upon said bolt controlling pin, a controlling link pivoted upon one extremity of said bolt retracting lever, a tripping head pivoted upon said controlling link, a second controlling link pivotally connected to said tripping head and said safe door, a trigger arranged to engage said tripping head and retain said bolt retracting lever in the set or locked position and means for automatically tripping said trigger at a predetermined time.

2. A device of the character described, comprising a safe door, a bolt slidably mounted in said door, a bolt controlling pin journaled in said door, a disk fixedly mounted upon said bolt controlling pin, a slotted link pivotally connected to said disk, a pin carried by said bolt and projecting through the slot in said link, a spring arranged to normally hold said bolt in the locked position, a retaining catch adapted to hold said bolt in the set position, means for disengaging the bolt from said retaining catch when the door is closed, a second disk loosely mounted upon said bolt controlling pin, said second disk being provided with a peripheral notch adapted to receive the inner extremity of the bolt, a pin carried by said second named disk and extending into an elongated notch in said first named disk, a spring pressed bolt retracting lever fixedly mounted upon said bolt controlling pin, a controlling link pivoted upon one extremity of said bolt retracting lever, a tripping head pivoted upon said controlling link, a second controlling link pivotally connected to said tripping head and said safe door, a trigger arranged to engage said tripping head and retain said bolt retracting lever in the set or locked position, a trigger actuating lever pivotally connected to said trigger, and means for automatically rocking said trigger actuating lever at a predetermined time.

3. A device of the character described, comprising a safe door, a bolt slidably mounted in said door, a bolt controlling pin journaled in said door, a link pivotally connecting said bolt and said bolt controlling pin, a spring arranged to normally hold said bolt in the locked position, a retaining catch arranged to retain said bolt in the set position, means for disengaging said bolt from said catch when the door is closed, a disk mounted upon said bolt controlling pin and provided with a notch adapted to receive the inner extremity of the bolt, a spring pressed bolt retracting lever fixedly mounted upon said bolt controlling pin, means for retaining said bolt retracting lever in the set or locked position and means for automatically releasing said bolt retracting lever at a predetermined time.

4. A device of the character described, comprising a safe door, a bolt slidably mounted in said door, a bolt controlling pin journaled in said door, a link pivotally connecting said bolt and said bolt controlling pin, a spring arranged to normally hold said bolt in the locked position, a retaining catch arranged to retain said bolt in the set position, means for disengaging said bolt from said catch when the door is closed, a disk mounted upon said bolt controlling pin and provided with a notch adapted to receive the inner extremity of the bolt, a spring pressed bolt retracting lever fixedly mounted upon said bolt controlling pin, a controlling link pivoted upon one extremity of said bolt retracting lever, a tripping head pivoted upon said controlling link, a second controlling link connected to said tripping head and pivoted upon said safe door, a trigger arranged to engage said tripping head and retain said bolt retracting lever in the set or locked position, and means for automatically tripping said trigger at a predetermined time.

5. A device of the character described, comprising a safe door, a bolt slidably mounted in said door, a bolt controlling pin journaled in said door, a link pivotally connecting said bolt and said bolt controlling pin, a spring arranged to normally hold said bolt in the locked position, a retaining catch arranged to retain said bolt in the set position, means for disengaging said bolt from said catch when the door is closed, a disk mounted upon said bolt controlling pin and provided with a notch adapted to receive the inner extremity of the bolt, a spring pressed bolt retracting lever fixedly mounted upon said bolt controlling pin, a controlling link pivoted upon one extremity of said bolt retracting lever, a tripping head pivoted upon said controlling link, a second controlling link pivotally connected to said tripping head and said safe door, a trigger arranged to engage said tripping head and retain said bolt retracting lever in the set or locked position, a trigger actuating lever pivotally connected to said trigger and means for automatically rocking said trigger actuating lever at a predetermined time.

6. A device of the character described, comprising a safe door, a prime bolt slidably mounted in said safe door, a prime bolt controlling pin journaled in said safe door, a gear fixedly mounted upon said prime bolt controlling pin and provided with a slot, a slotted link connecting said gear to said prime bolt, a second gear mounted upon said prime bolt controlling pin and provided with a pin which engages the slot in said first named gear, said second named gear being provided with a notch adapted to receive the inner extremity of said prime bolt, a secondary bolt slidably mounted in said safe door, a secondary bolt controlling pin mounted in said door, a gear mounted upon said secondary bolt controlling pin and meshing with the fixed gear on said prime bolt controlling pin, a slotted link connecting the gear on said secondary bolt controlling pin with said secondary bolt, a second gear mounted upon said secondary bolt controlling pin and meshing with the second named gear upon said prime bolt controlling pin, said last named gear being provided with a notch adapted to receive the inner extremity of the secondary bolt, springs arranged to normally hold said bolts in the locked position, a retaining catch arranged to hold said bolts in the set position, means for disengaging said bolts from said catch when the door is closed, and means for automatically rotating said prime bolt controlling pin at a predetermined time.

7. A device of the character described, comprising a safe door, a prime bolt slidably mounted in said safe door, a prime bolt controlling pin journaled in said safe door, a gear fixedly mounted upon said prime bolt controlling pin and provided with a slot, a slotted link connecting said gear to said prime bolt, a second gear mounted upon said prime bolt controlling pin and provided with a pin which engages the slot in said first named gear, said second named gear being provided with a notch adapted to receive the inner extremity of said prime bolt, a secondary bolt slidably mounted in said safe door, a secondary bolt controlling pin mounted in said door, a gear mounted upon said secondary bolt controlling pin and meshing with the fixed gear on said prime bolt controlling pin, a slotted link connecting the gear on said secondary bolt controlling pin with said secondary bolt, a second gear mounted upon said secondary bolt controlling pin and meshing with the second named gear upon said prime bolt controlling pin, said last named gear being provided with a notch adapted to receive the inner extremity of the secondary bolt, springs arranged to normally hold said bolts in the locked position, a retaining catch arranged to hold said bolts in the set position, means for disengaging said bolts from said catch when the door is closed, means for rotating the second named gear upon said secondary bolt controlling pin when the bolts assume the locked position and means for automatically rotating said prime bolt controlling pin at a predetermined time.

8. A device of the character described, comprising a safe door, a prime bolt slidably mounted in said safe door, a prime bolt controlling pin journaled in said safe door, a gear fixedly mounted upon said prime bolt controlling pin and provided with a slot, a slotted link connecting said gear to said prime bolt, a second gear mounted upon said prime bolt controlling pin and provided with a pin which engages the slot in said first named gear, said second named gear being provided with a notch adapted to receive the inner extremity of said prime bolt, a secondary bolt slidably mounted in said safe door, a secondary bolt controlling pin mounted in said door, a gear mounted upon said secondary bolt controlling pin and meshing with the fixed gear on said prime bolt controlling pin, a slotted link connecting the gear on said secondary bolt controlling pin with said secondary bolt, a second gear mounted upon said secondary bolt controlling pin and meshing with the second named gear upon said prime bolt controlling pin, said last named gear being provided with a notch adapted to receive the inner extremity of the secondary bolt, springs arranged to normally hold said bolts in the locked position, a retaining catch arranged to hold said bolts in the set position, means for disengaging said bolts from said catch when the door is closed, a spring pressed bolt retracting member fixedly mounted upon said prime bolt controlling pin, means for retaining said bolt retracting lever in the set or locked position and means for automatically releasing said bolt retracting lever at a predetermined time.

9. A device of the character described, comprising a safe door, a prime bolt slidably mounted in said safe door, a prime bolt controlling pin journaled in said safe door, a gear fixedly mounted upon said prime bolt controlling pin and provided with a slot, a slotted link connecting said gear to said prime bolt, a second gear mounted upon said prime bolt controlling pin and provided with a pin which engages the slot in said first named gear, said second named gear being provided with a notch adapted to receive the inner extremity of said prime bolt, a secondary bolt slidably mounted in said safe door, a secondary bolt controlling pin mounted in said door, a gear mounted upon said secondary bolt controlling pin and meshing with the fixed gear on said prime bolt controlling pin, a slotted link connecting the gear on said secondary bolt controlling pin with said secondary bolt, a second gear mounted upon said secondary bolt controlling pin and meshing with the second named gear upon said prime bolt controlling pin, said last named gear being provided with a notch adapted to receive the inner extremity of the secondary bolt, springs arranged to normally hold said bolts in the locked position, a retaining catch arranged to hold said bolts in the set position, means for disengaging said bolts from said catch when the door is closed, a spring pressed bolt retracting lever fixedly mounted upon said prime bolt controlling pin, a controlling link pivoted upon one extremity of said bolt retracting lever, a tripping head pivoted upon said controlling link, a second controlling link connected to said tripping head and pivoted upon said safe door, a trigger arranged to engage said tripping head and retain said bolt retracting lever in the set or locked position and means for automatically tripping said trigger at a predetermined time.

10. A device of the character described, comprising a safe door, a prime bolt slidably mounted in said safe door, a prime bolt controlling pin journaled in said safe door, a gear fixedly mounted upon said prime bolt controlling pin and provided with a slot, a slotted link connecting said gear to said prime bolt, a second gear mounted upon said prime bolt controlling pin and provided with a pin which engages the slot in said first named gear, said second named gear being provided with a notch adapted to receive the inner extremity of said prime bolt, a secondary bolt slidably mounted in said safe door, a secondary bolt controlling pin mounted in said door, a gear mounted upon said secondary bolt controlling pin and meshing with the fixed gear on said prime bolt controlling pin, a slotted link connecting the gear on said secondary bolt controlling pin with said secondary bolt, a second gear mounted upon said secondary bolt controlling pin and meshing with the second named gear upon said prime bolt controlling pin, said last named gear being provided with a notch adapted to receive the inner extremity of the secondary bolt, springs arranged to normally hold said bolts in the locked position, a retaining catch arranged to hold said bolts in the set position, means for disengaging said bolts from said catch when said door is closed, a spring pressed bolt retracting lever fixedly mounted upon said prime bolt controlling pin, a controlling link pivoted upon one extremity of said bolt retracting lever, a tripping head pivoted upon said controlling link, a second controlling link connected to said tripping head and pivoted upon said safe door, a trigger arranged to engage said tripping head and retain said bolt retracting lever in the set or locked position, a trigger actuating lever pivotally connected to said trigger and means for automatically rocking said trigger actuating lever at a predetermined time.

11. A device of the character described, comprising a safe door, a prime bolt slidably mounted in said safe door, a prime bolt controlling pin journaled in said safe door, a gear fixedly mounted upon said prime bolt controlling pin and provided with a slot, a slotted link connecting said gear to said prime bolt, a second gear mounted upon said prime bolt controlling pin and provided with a pin which engages the slot in said first named gear, said second named gear being provided with a notch adapted to receive the inner extremity of said prime bolt, a secondary bolt slidably mounted in said safe door, a secondary bolt controlling pin mounted in said door, a gear mounted upon said secondary bolt controlling pin and meshing with the fixed gear on said prime bolt controlling pin, a slotted link connecting the gear on said secondary bolt controlling pin with said secondary bolt, a second gear mounted upon said secondary bolt controlling pin and meshing with the second named gear upon said prime bolt controlling pin, said last named gear being provided with a notch adapted to receive the inner extremity of the secondary bolt, springs arranged to normally hold said bolts in the locked position, a retaining catch arranged to hold said bolt in the set position, means for disengaging said bolts from said catch when the door is closed, means for rotating the second named gear upon said secondary bolt controlling pin when the bolts assume the locked position, a spring pressed bolt retracting member fixedly mounted upon said prime bolt controlling pin, means for retaining said bolt retracting lever in the set or locked position and means for automatically releasing said bolt retracting lever at a predetermined time.

12. A device of the character described, comprising a safe door, a prime bolt slidably mounted in said safe door, a prime bolt controlling pin journaled in said safe door, a gear fixedly mounted upon said prime bolt controlling pin and provided with a slot, a slotted link connecting said gear to said prime bolt, a second gear mounted upon said prime bolt controlling pin and provided with a pin which engages the slot in said first named gear, said second named gear being provided with a notch adapted to receive the inner extremity of said prime bolt, a secondary bolt slidably mounted in said safe door, a secondary bolt controlling pin mounted in said door, a gear mounted upon said secondary bolt controlling pin and meshing with the fixed gear on said prime bolt controlling pin, a slotted link connecting the gear on said secondary bolt controlling pin with said secondary bolt, a second gear mounted upon said secondary bolt controlling pin and meshing with the second named gear upon said prime bolt controlling pin, said last named gear being provided with a notch adapted to receive the inner extremity of the secondary bolt, springs arranged to normally hold said bolts in the locked position, a retaining catch arranged to hold said bolts in the set position, means for disengaging said bolts from said catch when the door is closed, means for rotating the second named gear upon said secondary bolt controlling pin when the bolts assume the locked position, a spring pressed bolt retracting lever fixedly mounted upon said prime bolt controlling pin, a controlling link pivoted upon one extremity of said bolt retracting lever, a tripping head pivoted upon said controlling link, a second controlling link connected to said tripping head and pivoted upon said safe door, a trigger arranged to engage said tripping head and retain said bolt retracting lever in the set or locked position and means for automatically tripping said trigger at a predetermined time.

13. A device of the character described, comprising a safe door, a prime bolt slidably mounted in said safe door, a prime bolt controlling pin journaled in said safe door, a gear fixedly mounted upon said prime bolt controlling pin and provided with a slot, a slotted link connecting said gear to said prime bolt, a second gear mounted upon said prime bolt controlling pin and provided with a pin which engages the slot in said first named gear, said second named gear being provided with a notch adapted to receive the inner extremity of said prime bolt, a secondary bolt slidably mounted in said safe door, a secondary bolt controlling pin mounted in said door, a gear mounted upon said secondary bolt controlling pin and meshing with the fixed gear on said prime bolt controlling pin, a slotted link connecting the gear on said secondary bolt controlling pin with said secondary bolt, a second gear mounted upon said secondary bolt controlling pin and meshing with the second named gear upon said prime bolt controlling pin, said last named gear being provided with a notch adapted to receive the inner extremity of the secondary bolt, springs arranged to normally hold said bolts in the locked position, a retaining catch arranged to hold said bolts in the set position, means for disengaging said bolts from said catch when said door is closed, means for rotating the second named gear upon said secondary bolt controlling pin when the bolts assume the locked position, a spring pressed bolt retracting lever fixedly mounted upon said prime bolt controlling pin, a controlling link pivoted upon one extremity of said bolt retracting lever, a tripping head pivoted upon said controlling link, a second controlling link connected to said tripping head and pivoted upon said safe door, a trigger arranged to engage said tripping head and retain said bolt retracting lever in the set or locked position, a trigger actuating lever pivotally connected to said trigger and means for automatically rocking said trigger actuating lever at a predetermined time.

14. A device of the character described, comprising a safe door, a bolt barrel slidably mounted in said door, a bolt carried in said bolt barrel, a bolt controlling pin journaled in said door, a disk fixedly mounted upon said bolt controlling pin, a slotted link pivotally connected to said disk, a pin carried by said bolt barrel and projecting through the slot in said link, a spring arranged to normally hold said bolt barrel in the locked position, a retaining catch adapted to hold said bolt barrel in the set position, means for disengaging the bolt barrel from said retaining catch when the door is closed, a second disk loosely mounted upon said bolt controlling pin, said second disk provided with a peripheral notch adapted to receive the inner extremity of the bolt, a pin carried by said second named disk and extending into an elongated notch in said first named disk, a spring pressed bolt retracting lever fixedly mounted upon said bolt controlling pin, a controlling link pivoted upon one extremity of said bolt retracting lever, a tripping head pivoted upon said controlling link, a second controlling link connected to said tripping head and pivoted upon said safe door, a trigger arranged to engage said tripping head and retain said bolt retracting lever in the set or locked position and means for automatically tripping said trigger at a predetermined time.

15. A device of the character described, comprising a safe door, a bolt barrel slidably mounted in said door, a bolt carried in said bolt barrel, a bolt controlling pin journaled in said door, a disk fixedly mounted upon said bolt controlling pin, a slotted link pivotally connected to said disk, a pin carried by said bolt barrel and projecting through the slot in said link, a spring arranged to normally hold said bolt barrel in the locked position, a retaining catch adapted to hold said bolt barrel in the set position, means for disengaging the bolt barrel from said retaining catch when the door is closed, a second disk loosely mounted upon said bolt controlling pin, said second disk provided with a peripheral notch adapted to receive the inner extremity of the bolt, a pin carried by said second named disk and extending into an elongated notch in said first named disk, a spring pressed bolt retracting lever fixedly mounted upon said bolt controlling pin, a controlling link pivoted upon one extremity of said bolt retracting lever, a tripping head pivoted upon said controlling link, a second controlling link connected to said tripping head and pivoted upon said safe door, a trigger arranged to engage said tripping head and retain said bolt retracting lever in the set or locked position, a trigger actuating lever pivotally connected to said trigger and means for automatically rocking said trigger actuating lever at a predetermined time.

16. A device of the character described, comprising a safe door, a bolt barrel slidably mounted in said door, a bolt mounted in said bolt barrel, a bolt controlling pin journaled in said door, a link pivotally connecting said bolt barrel and said bolt controlling pin, a spring arranged to normally hold said bolt barrel in the locked position, a retaining catch arranged to retain said bolt barrel in the set position, means for disengaging said bolt barrel from said catch when the door is closed, a disk mounted upon said bolt controlling pin and provided with a notch adapted to receive the inner extremity of the bolt, a spring pressed bolt retracting lever fixedly mounted upon a controlling link pivoted upon one extremity of said bolt retracting lever, a tripping head pivoted upon said controlling link, a second controlling link connected to said tripping head and pivoted upon said safe door, a trigger arranged to engage said tripping head and retain said bolt retracting lever in the set or locked position and means for automatically tripping said trigger at a predetermined time.

17. A device of the character described, comprising a safe door, a bolt barrel slidably mounted in said door, a bolt mounted in said bolt barrel, a bolt controlling pin journaled in said door, a link pivotally connecting said bolt barrel and said bolt controlling pin, a spring arranged to normally hold said bolt barrel in the locked position, a retaining catch arranged to retain said bolt barrel in the set position, means for disengaging said bolt barrel from said catch when the door is closed, a disk mounted upon said bolt controlling pin and provided with a notch adapted to receive the inner extremity of the bolt, a spring pressed bolt retracting lever fixedly mounted upon said bolt controlling pin, a controlling link pivoted upon one extremity of said bolt retracting lever, a tripping head pivoted upon said controlling link, a disk controlling link connected to said tripping head and pivoted upon said safe door, a trigger arranged to engage said tripping head and retain said bolt retracting lever in the set or locked position, a trigger actuating lever pivotally connected to said trigger and means for automatically rocking said trigger actuating lever at a predetermined time.

18. A device of the character described, comprising a safe door, a prime bolt barrel slidably mounted in said safe door, a prime bolt mounted within said barrel, a prime bolt controlling pin journaled in said safe door, a gear fixedly mounted upon said prime bolt controlling pin and provided with a slot, a slotted link connecting said gear to said prime bolt barrel, a second gear mounted upon said prime bolt controlling pin and provided with a pin which engages the slot in said first named gear, said second named gear being provided with a notch adapted to receive the inner extremity of said prime bolt, a secondary bolt barrel slidably mounted within said safe door, a secondary bolt mounted in said secondary bolt barrel, a secondary bolt controlling pin mounted in said door, a gear mounted upon said secondary bolt controlling pin and meshing with the fixed gear on the prime bolt controlling pin, a slotted link connecting the gear on said secondary bolt controlling pin with said secondary bolt barrel, a second gear mounted upon said secondary bolt controlling pin and meshing with the second named gear upon said prime bolt controlling pin, said last named gear being provided with a notch adapted to receive the inner extremity of the secondary bolt, springs arranged to normally hold said bolt barrels in the locked position, a retaining catch arranged to hold said bolt barrels in the set position, means for disengaging said bolt barrels from said catch when the door is closed, and means for automatically retaining said prime bolt controlling pin at a predetermined time.

19. A device of the character described, comprising a safe door, a prime bolt barrel slidably mounted in said safe door, a prime bolt mounted within said barrel, a prime bolt controlling pin journaled in said safe door, a gear fixedly mounted upon said prime bolt controlling pin and provided with a slot, a slotted link connecting said gear to said prime bolt barrel, a second gear mounted upon said prime bolt controlling pin and provided with a pin which engages the slot in said first named gear, said second named gear being provided with a notch adapted to receive the inner extremity of said prime bolt, a secondary bolt barrel slidably mounted within said safe door, a secondary bolt mounted in said secondary bolt barrel, a secondary bolt controlling pin mounted in said door, a gear mounted upon said secondary bolt controlling pin and meshing with the fixed gear on the prime bolt controlling pin, a slotted link connecting the gear on said secondary bolt controlling pin with said secondary bolt barrel, a second gear mounted upon said secondary bolt controlling pin and meshing with the second named gear upon said prime bolt controlling pin, said last named gear being provided with a notch adapted to receive the inner extremity of the secondary bolt, springs arranged to normally hold said bolt barrels in the locked position, engaging fingers mounted upon said bolt barrels, a retaining catch arranged to receive said engaging fingers when the bolts are in the set position, a spring provided upon said retaining catch and adapted to normally hold said retaining catch out of contact with said engaging fingers, a lug provided upon said fixed gear and adapted to contact with said spring and press said retaining catch into engagement with said engaging fingers when said bolt barrels are in the set position and means for automatically rotating said prime bolt controlling pin at a predetermined time In testimony that I claim the above. I have hereunto subscribed my name in the presence of two witnesses.

BARTHOLOMEW F. KLOHS.

Witnesses:
J. H. BISHOP,
SYLVIA BORON.

Copies of this patent may be obtained for five cents each, by addressing the "Commissioner of Patents, Washington, D. C."